UNITED STATES PATENT OFFICE.

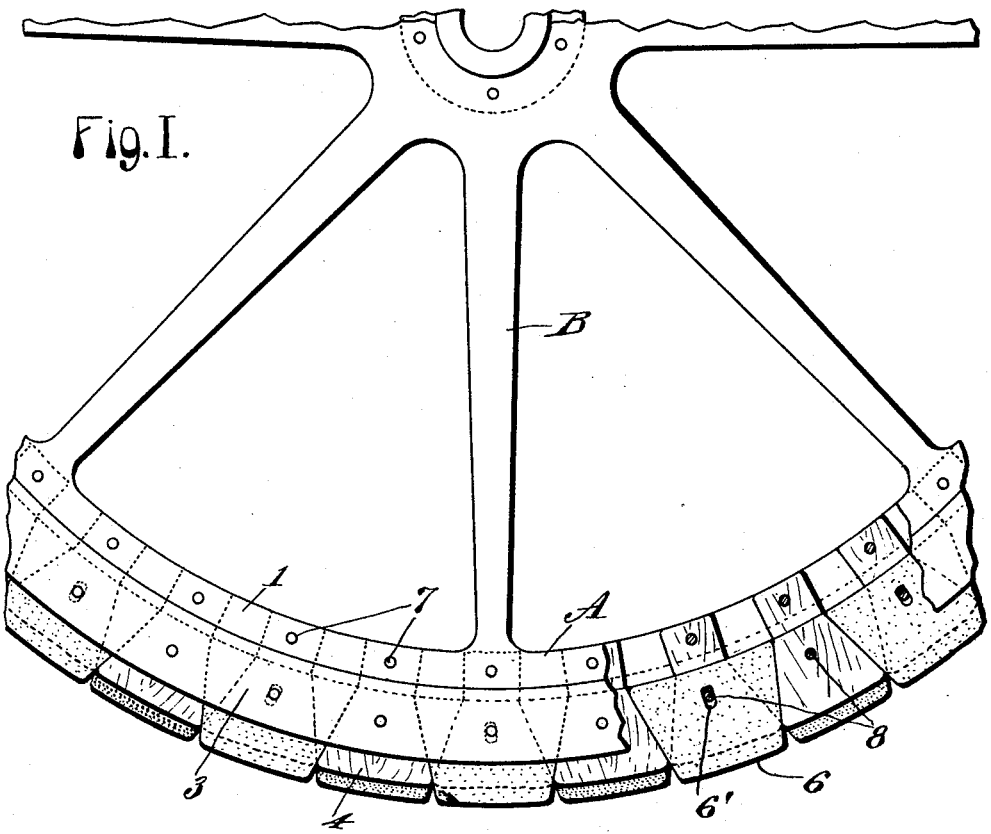
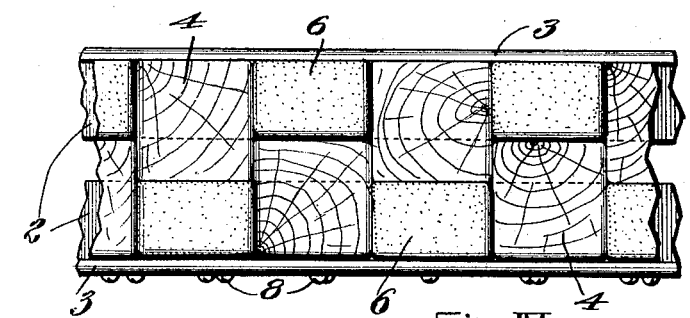
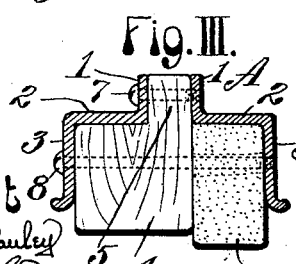 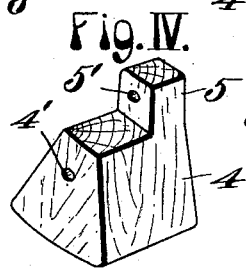 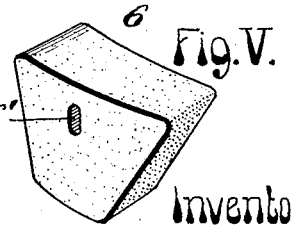

LOUIS S. FLATAU, OF ST. LOUIS, MISSOURI.

VEHICLE-WHEEL.

1,115,920.   Specification of Letters Patent.   Patented Nov. 3, 1914.

Application filed September 29, 1913. Serial No. 792,445.

*To all whom it may concern:*

Be it known that I, LOUIS S. FLATAU, a citizen of the United States of America, and a resident of the city of St. Louis and State of Missouri, have invented certain new and useful Improvements in Vehicle-Wheels, of which the following is a full, clear, and exact description, reference being had to the accompanying drawings, forming a part of this specification.

My invention relates to a vehicle wheel intended for use, more particularly, upon motor vehicles, or other vehicles carrying heavy loads, one of the objects of the invention being to provide a wheel tread of durability and strength commensurate with the strain and wear imposed thereon; and, further, to provide a tread capable of a highly effective frictional contact between the tread and roadway surface, with a minimum tendency of the tread to skid or slip upon a slippery roadway.

A further object of my invention is to provide a wheel tread having the characteristics referred to and including, also, the feature of resiliency desirable in vehicle wheels.

Figure I is a side elevation of a fragment of my wheel, with a portion of the wheel rim broken away to afford a view of the parts back of such portion. Fig. II is a face view of the tread of my wheel. Fig. III is a cross section through the wheel rim with the tread members shown in elevation. Fig. IV is a perspective view of one of the solid tread and felly forming blocks. Fig. V is a perspective view of one of the elastic tread blocks.

In the drawings: A designates the rim of my vehicle wheel, and B the wheel body or spider.

The rim A comprises inner parallel rings 1 spaced from each other and entering into the structure of the wheel felly, as will be hereinafter more fully explained. The rim also comprises wings 2 extending laterally from the inner wings 1, and outer parallel side flanges 3 spaced from each other more widely than the inner felly wings, the latter, in conjunction with the wings 2, serving to provide an annular channel pocket in which the tread forming members, to be described, are seated and held.

The tire of my wheel is made up of alternately arranged non-resilient blocks 4, preferably of wood, and resilient blocks 6, preferably of rubber, which occupy the annular channel in the wheel rim A, and are of sufficient length to protrude beyond the edges of the wheel rim flanges 3 to form the tire tread.

The wooden blocks 4 of the tire of my wheel are of wedge shape, their broadest or butt end being located outermost, or at the tread of the wheel and said blocks are provided at their inner ends with tongues or extensions 5, which are seated between the felly rings 1 of the rim A, as seen in Figs. I and III, where they serve, in conjunction with the rim rings 1, to form the felly of the wheel. The tongues 5 of said blocks are located at their inner sides relative to the side flanges of the wheel rim against which each block fits, and the inner end of each block, aside from its extension 5, rests against the lateral wing 2 intervening between said side flange and the felly rim ring with which it is associated. The blocks 4 are arranged alternately, first at one side of the wheel rim A and then at the opposite side of said rim, so that they are in staggered relation throughout the rim, as seen most clearly in Fig. II. By thus disposing the blocks 4, I provide pockets therebetween having facing inclined walls diverging inwardly and occurring in staggered relation, first at one side of the rim and then at the other side of the rim between the blocks 4. These pockets are occupied by the resilient blocks 6, next to be described.

The elastic blocks 6 arranged in the pockets between the wooden blocks 4 are of wedge shape, and are arranged in the tire with their broadest or butt ends innermost and seated against the lateral wings 2 of the wheel rim A. It will be understood that, inasmuch as the blocks 4 are of wedge shape and have their larger ends outermost, the pockets therebetween for the blocks 6 are rendered of dove-tail shape, or widened inwardly; and the blocks 6 being also of wedge shape, and seated in the pockets with their broadest ends innermost, said blocks 6 are confined in the pockets with the blocks 4 acting to wedge them therein and prevent their escape from the pockets. The blocks 6 are of greater length than the wooden blocks 4 and, therefore, project beyond the tread faces of the wooden blocks, as seen in Figs. I and III, to receive first contact with the ground in the movement of my wheel thereon, and require compression previous to contact of the wooden blocks with the same ground surface.

Suitable means for fastening the blocks 4 and 6 in the wheel rim A, such as screws 7 and 8, pass respectively, transversely through the tenon forming rim rings 1 and extensions 5 of the blocks 4, and through the side rim flanges 3 and the blocks 4 and 6. To provide for the passage of the fastening means through the blocks 4 and their extensions, transverse holes 4' and 5' are formed in said blocks, and for a similar purpose, the blocks 6 are provided with transverse holes 6', which are elongated radially of the wheel, in order that the screws or fastening means passing therethrough will not interfere with the compression and expansion of said blocks.

In the practical use of my vehicle wheel, the resilient blocks 6 contacting first with the roadway surface as the wheel turns thereon afford a desirable degree of resilience while being compressed by the weight imposed upon them; and upon their compression to a degree sufficient to carry their tread surfaces flush with the tread surfaces of the solid blocks 4, both sets of blocks become in contact with the roadway surface and act as tread members with the wooden blocks serving to withstand the greatest proportion of the strain and other influences to which the wheel tread is subjected.

I desire to lay particular attention to the wooden blocks 4 being staggered, as herein described, so that they overlap each other from opposite sides of the wheel rim, and the provision of the felly forming extensions 5 of these blocks leading therefrom into and constituting elements of the wheel felly. This arrangement provides a solid tread surface at the transverse center of the wheel tread throughout the circumference of the wheel; and, furthermore, provides for the connection of the solid blocks into the felly, with the result of furnishing a very strong, substantial, and effective structure.

The wooden tread and felly forming segments of my wheel are produced with the grain of the wood therein running lengthwise of the segments, or in a direction which is radial with the axis of the wheel when the segments are mounted therein; and the production of wooden segments with the grain running in this direction is an important feature of my present invention. By so making the wooden segments, the ends of the grain therein are presented to the roadway on which the wheel travels, and all impact against the wheel is directed longitudinally of the grain, without liability of the wood being slivered, flaked or split, as would be liable to occur if the grain in the wood of the sections extended transversely instead of longitudinally thereof.

A wheel made in accordance with my invention is extremely durable and inexpensive of manufacture, the segments may be easily and quickly replaced when repairs are necessary, and the construction of the wooden segments provides the necessary felly of the wheel. The tread of the wheel, being largely of wood, is not liable to slip upon a roadway as other materials from which the treads or tires of vehicle wheels are made; and, consequently, the tread of my wheel obtains a highly effective tractional purchase upon a roadway, and is not likely to skid on a wet roadway under ordinary conditions.

I claim:—

1. A wheel comprising a channel rim, a series of non-resilient tread blocks mounted in said rim the said blocks being arranged in staggered relation and extending alternately first from one side of said rim and then from the other side of the rim a distance less than the width of the tire tread providing pockets alternating first at one side of the tread and then at the opposite side of the tread, and resilient tread blocks in said pockets.

2. A wheel comprising a channel rim having felly members, a series of non-resilient tread blocks mounted in said rim, and a series of resilient tread blocks interposed between the first mentioned blocks, said non-resilient tread blocks being provided at their inner ends with felly extensions which lie between said felly members.

3. A wheel comprising a channel rim having spaced inner felly rings and side flanges, two series of tread blocks in said channel rim extending transversely of the rim from the side flanges and overlapping at the transverse center of the rim, said blocks being provided with felly extensions seated between said felly rings of said rim.

4. A wheel comprising a channel rim having spaced inner felly rings and side flanges, two series of tread blocks in said channel rim extending transversely of the rim from the side flanges and overlapping at the transverse center of the rim, said blocks being provided with felly extensions seated between said felly rings of said rim, and tread blocks interposed between the first mentioned tread blocks.

LOUIS S. FLATAU.

In the presence of—
E. K. CLARK,
E. B. LINN.